Patented Sept. 18, 1951

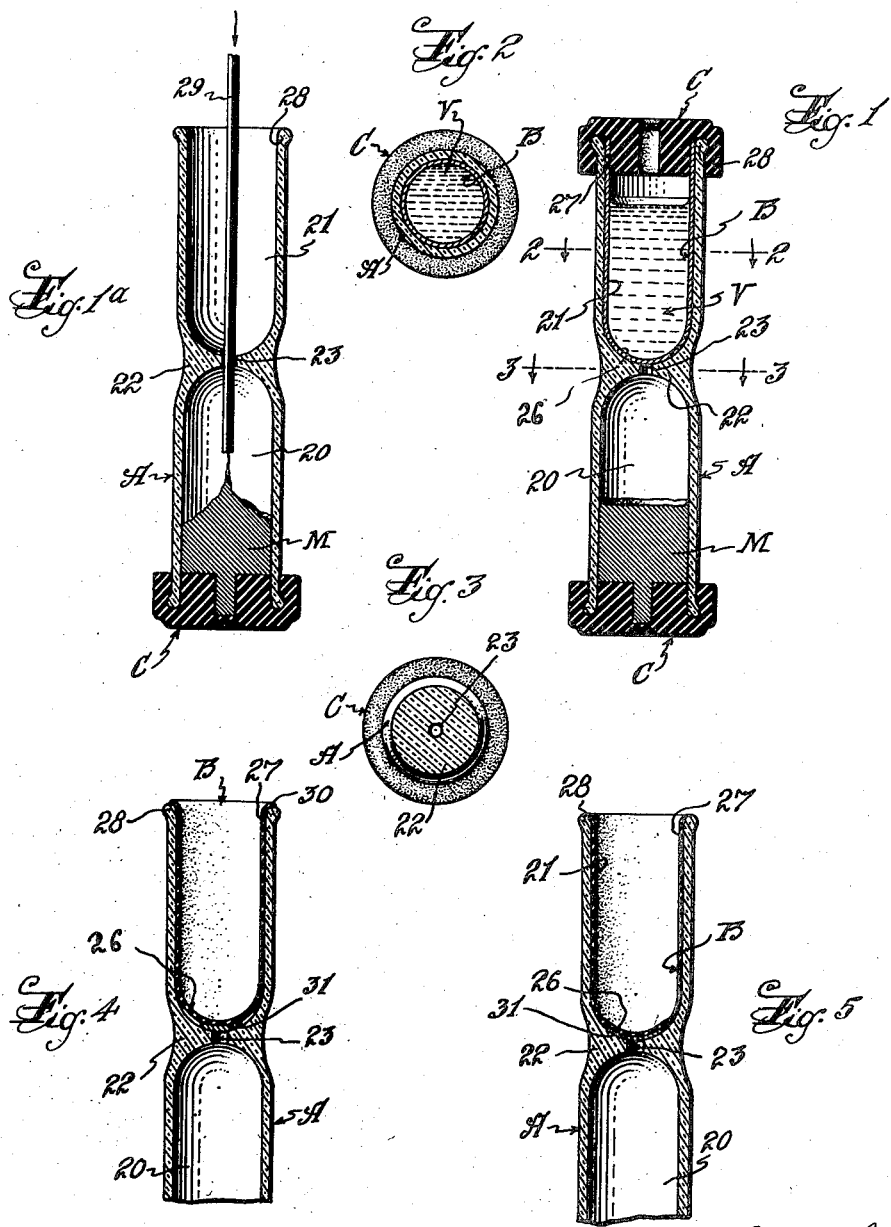

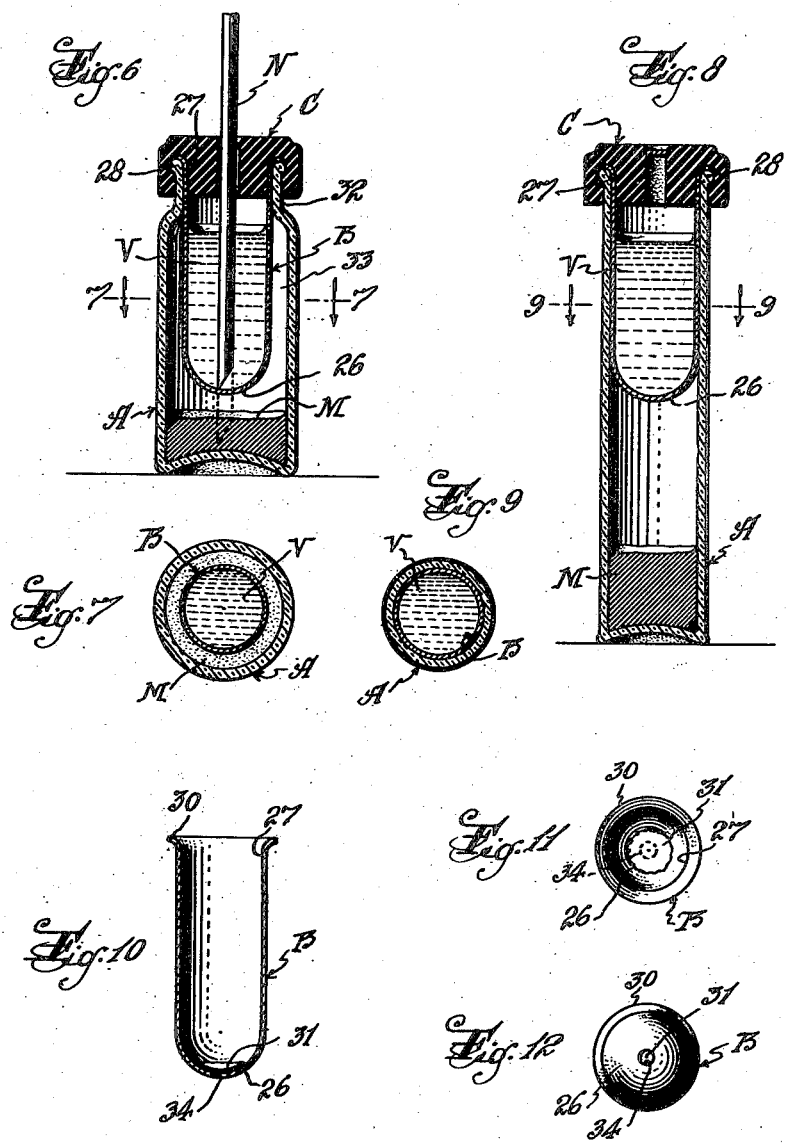

2,568,029

UNITED STATES PATENT OFFICE 2,568,029

UNITARY CONTAINER FOR HYPODERMIC INJECTION INGREDIENTS

George H. Seemar, Chatham, N. J.

Application February 9, 1950, Serial No. 143,189

8 Claims. (Cl. 128—272)

The invention relates in general to pharmaceutical accessories and has particular reference to aseptic packaging containers for medicaments that are administered by hypodermic injection.

Narcotic drugs and other medicaments that are to be administered by use of a hypodermic syringe usually are preserved in their free state separate from the liquid solvent vehicles therefor until a time immediately preceding actual administration of the injection. At that time, the medicament is dissolved in its appropriate vehicle to form the final injection solution, which, in consequence of this procedure, will be fresh and of maximum potency.

Prior to my invention, it had been the practice to package the ingredients for an injection charge to be administered by the conventional single-needle hypodermic syringe in separate and distinct containers. Usually, these separate containers have been in the form of small bottles having puncturable sealing caps for their respective filling mouths.

The use of separate bottles for the ingredients of an injection solution is objectionable in several respects. The necessity for withdrawing the syringe needle from the bottle containing the solvent vehicle and moving it through the dust-laden air before insertion in the medicament bottle, with consequent danger of contamination of the injection solution, is one disadvantage that favors use of a unitary container having separate ingredient compartments separated by a puncturable sealing membrane, such as I have heretofore invented and disclosed in my co-pending application, Ser. No. 132,648, filed December 13, 1949. Another compelling reason for preferring a pluri-compartment unitary container instead of the two-bottle container set is the reduced cost of the improved container device that may be realized if all details of the design be directed toward that end while meeting the requirements of practical utility.

The earlier embodiment of my invention, as disclosed in the above-cited co-pending application, comprised a single tubular body divided by an intermediate wall, having a through passage sealed by a membrane of puncturable material, into two compartments, one to contain the medicament and the other for the liquid solvent vehicle. The opposite ends of the body were sealed by puncturable closure caps of conventional design. In seeking a completely satisfactory material for fabrication of the sealing membrane for the wall passage, it was discovered that pyroxylin met all of the very strict medical requirements and could be formed into a suitable membrane by following a unique method involving use of pyroxylin in solution in ether, in which state it is known as "collodion." One of the practical advantages of the pyroxylin is its adhesive property. In its use with a glass container body, perfect adhesion of the marginal portion of the membrane to the intermediate container wall produces a completely impervious seal that has not been attainable in experiments with rubber and similar materials.

The pluri-compartment container disclosed in my said co-pending patent application was intended primarily for packaging the ingredients of an injection charge wherein the medicament ingredient was in dry, granular or powdered form and proved to be quite satisfactory for that purpose. However, it now appears that certain medicaments, such as some of the vitamins and particularly Vitamin B, cannot satisfactorily be packaged in a container of that particular structure, wherein the inter-compartment sealing membrane preferably is permanently installed prior to introduction of the respective ingredients into their appropriate compartments. For example, whereas a dry, granular or powdered medicament or one that is in stable liquid form may conveniently be poured into the mouth of the appropriate compartment and will behave in a satisfactory manner after the closure cap has been applied to the said mouth, this is not the case when Vitamin B, for instance, is the medicament ingredient. This vitamin may be transformed into its concentrated, liquid state by heating so that it may be poured readily into the mouth of the medicament compartment of my earlier model of container when the latter is standing on end with a medicament compartment uppermost. When this is done, however, the medicament will be deposited on the partitioning wall and sealing membrane and will fill the wall passage. Vitamin B possesses the characteristic of becoming solidified from the heat-produced liquid state into an amorphous, putty-like mass almost instantly after becoming chilled. This means that, before such a container is likely to become inverted in position in the course of normal filling and capping operations, the entire medicament contents of the uppermost compartment will have become permanently adhered to the partitioning wall. In consequence of this condition, when the needle of a hypodermic syringe pierces the sealing membrane for the intended purpose of transferring the solvent vehicle from its original compartment to the medicament compartment, the hollow needle point will have to penetrate the Vitamin B mass, too, and will become clogged in an obviously serious manner.

Because of the difficulty thus encountered in the use of my earlier model of container with vitamins as the medicament ingredients, it is the primary object of my present invention to provide a pluri-compartment container that will accommodate vitamins as well as crystalline or stable liquid medicaments.

To be explicit, I have accomplished that object by providing telescoping outer and inner container sections that are adapted to be assembled after the medicament has been admitted to the outer section. The outer container section is like a bottle and may be caused to stand upright upon its base with its mouth in the usual position for filling by pouring. The inner container section preferably is thimble-shaped and may be lowered through the mouth of the outer container for suspension in the upper portion thereof either before or after being filled with the solvent vehicle. In assembled relation, the mouth of the outer container section embraces the outer end of the inner container section and the mouths of both sections are closely contiguous and in some embodiments flush with each other. When a common puncturable closure cap of conventional design has been fitted to the contiguous mouths of both container sections, the latter will be effectively sealed from the outside atmosphere and from each other, whereby the inner container section acts in the dual capacity of a receptacle for the solvent vehicle and as a sealing membrane interposed between the two related ingredients.

With the improved unitary container, if Vitamin B happens to be the medicament ingredient, it will solidify as usual but in safe adherence to the bottom of the outer container section before a change in position of the said container could, in due course of the filling, assembly and capping operations, cause any of the Vitamin B ingredient to become deposited upon the puncturable inner end, or bottom, of the inner container section for undesirable engagement by the hypodermic needle.

A further object of the invention is to provide all of the structural features essential to a satisfactory pluri-compartment container without rendering the cost prohibitive. As a matter of fact, in the preferred embodiment of the improved container, it is quite likely that the outer and inner sections thereof, as well as the common closure caps, may be supplied from articles of manufacture now in stock, instead of having to produce a specially formed two-compartment integral container body in accordance with the teaching of my earlier patent application cited herein.

Other objects and advantages of the invention will become apparent as the following specific description is read in connection with the accompanying drawings, in which:

Fig. 1 is a longitudinal axial sectional view of the earlier embodiment of the invention as disclosed in my co-pending application and as modified in accordance with the present improvement; Fig. 1a is a view similar to Fig. 1, showing the mode of introducing the medicament ingredient; Fig. 2 is a transverse section on line 2—2 of Fig. 1; Fig. 3 is a similar view on line 3—3 of Fig. 1; Fig. 4 is a fragmentary longitudinal axial sectional view, showing use of a separately produced rubber inner container section; and Fig. 5 is a similar view showing a rubber inner container section that is produced inside the outer container section.

Fig. 6 is a longitudinal axial sectional view of one form of the preferred general embodiment of the invention, showing the method of mixing the ingredients by use of a hypodermic syringe; and Fig. 7 is a transverse section on line 7—7 of Fig. 6.

Fig. 8 is a longitudinal axial sectional view of a modified form of the embodiment represented in Figs. 6 and 7; and Fig. 9 is a transverse section on line 9—9 of Fig. 8.

Fig. 10 is a detail longitudinal axial sectional view of a modified form of inner container section; Fig. 11 is a top plan view of the same; and Fig. 12 is a bottom plan view.

As explained in the preamble, my improved container comprises three principal parts, viz; inner and outer telescoping container sections and a common closure cap for the contiguous mouths of both container sections.

Since commercial considerations may indicate the desirability of utilizing the tubular container body disclosed in my co-pending application, Serial Number 132,648, filed December 13, 1949, in the construction of my improved container, that can be done very conveniently in a manner which will now be explained in detail.

Referring generally to the drawings, in which like reference characters designate corresponding parts in the several views, Figs. 1 to 5 illustrate three different ways in which my earlier tubular container may be converted to use as a component part of the improved container, and Figs. 6 to 9 illustrate the preferred embodiment of the invention, in two exemplary forms, wherein all component parts are specifically designed or selected for their cooperative employment.

Referring now in particular to Figs. 1 to 3, the three principal parts are outer container section A, inner container section B, and closure cap C for the contiguous mouth ends of the two container sections when assembled in the telescoping relation shown. The second closure cap which is shown applied to the bottom end of outer container section A merely takes the place of an integral glass bottom, which cannot economically be fabricated for the conversion model. This extra cap is the same as the conventional puncturable rubber cap chosen as a closure for the mouth ends of both container sections and also has been designated by the reference character C but is not to be confused with cap C that is one of the three principal parts of the improved container. Obviously, when Vitamin B is to be the medicament ingredient, the extra bottom cap must be applied in the position shown before the medicament is admitted to the container in the manner which will be described later herein. Outer container section A, which is the tubular open-ended body of the container covered by the cited co-pending application, is divided into two separate compartments 20 and 21 by intermediate partitioning wall 22 formed by appropriate glass-working treatment. Wall 22 has a central through passage 23 of a diameter which preferably is just sufficient to permit free penetration of the needle of a hypodermic syringe. A diameter of 3 m.m., for example, will accommodate the largest size needle that is likely to be encountered in practical use. The desirability of providing minimum free clearance will become apparent as the description progresses.

When Vitamin B is to be used as the medicament ingredient, it must be poured into the selected compartment, which will be assumed to be the lower compartment 20, through wall passage 23. Therefore, it is desirable to use some such means as the filling tube 29 in the manner shown in Fig. 1a to insure free flow of the somewhat viscous liquid. In order that passage 23 may be open for the filling operation, the pyroxylin membrane employed in my earlier container to seal the said passage has been omitted, and, because of the undesirability of subjecting the medicament to the ether used as a solvent for pyroxylin, it is impracticable to reinstall the sealing membrane after the medicament has been admitted through passage 23 to compartment 20.

Compartment 21 is utilized as a receiver for inner container section B, which in this and all other embodiments of the invention preferably is a thimble-shaped, cylindrical tube having its bottom end closed and its top end open. Preferably, inner container section B should be of such shape and size that it will fit slidably inside compartment 21 in the manner shown with its rounded bottom wall 26 resting upon intermediate wall 22 of outer container section A and with its open filling mouth 27 substantially flush with the mouth 28 of said compartment 21. When thus assembled with outer container section A, inner section B as a whole is an ingredient container and that area of its bottom wall 26 which is disposed in closing relation to passage 23 serves as a sealing membrane for the latter.

Because of the sealing function of bottom wall 26 of inner container section B, the precise composition of said container section is of utmost importance. Although it is preferred to make outer container section A of glass, that material is unsuitable for inner container section B when it is to be of the one-piece construction shown in Figs. 1 to 3. That is because glass is not puncturable by a hypodermic needle unless the inner container section B is very thin. Even then, penetration will cause fragmentation and introduction of dangerous glass particles into the injection solution. In order to meet the strict medical requirements, the sealing bottom portion, at least, of inner container section B must be composed of a material that is non-frangible, non-toxic, readily needle-penetrated, and inert to chemical reaction in contact with either of the ingredients of the hypodermic injection solution. There are several suitable materials that are readily available, such as rubber, pyroxylin, neoprene, and other plastics of a more inflexible, shape-retaining nature like Lucite, which is a transparent, crystal-clear, synthetic resin chemically termed polymethyl methacrylate.

While any material selected from the acceptable group will meet the basic medical requirements, some will possess physical qualities that must be taken into consideration when determining the precise form and mode of assembly of the inner and outer container sections. For example, Lucite is rigid in structure and more resistant to collapse under pressure than rubber, which is soft and flexible. In the drawings and in the following description, the adaptation of a succession of different materials within the acceptable group to use in the fabrication of the inner container section is illustrated and explained.

Assuming first that Lucite is to be used, Figs. 1 and 2 show an inner container section B made of that material. Because of the rigidity of Lucite, when cap C is applied to the contiguous mouths of both container sections, the inner core portion of the cap will not cause the upper end of the said inner section to collapse downward in spite of the frictional pressure that is exerted while the said core is entering the mouth of inner container section B. Consequently, it is practicable to provide inner container section B with a plain mouth rim of the same diameter as the rest of the said container section and to make the length of the latter such that the mouth rim will be flush with the mouth rim of compartment 21 of outer container section A. Besides the simplicity of the foregoing structure of a Lucite inner container section B, there is the advantage of transparency which permits visual inspection of the contents of said inner section through the walls of both container sections.

The method of loading the container illustrated in Figs. 1 to 3 will be explained with reference to Fig. 1a, which shows the first step, i. e. the introduction of medicament M to outer container section A. After outer container section A has been placed in an erect position with its capped compartment 20 lowermost, the vitamin B in a liquid state is poured through wall passage 23 by use of a filling tube 29. Then, inner container section B is inserted in the mouth 28 of outer container section A and lowered into contact with wall 22 in closing relation to passage 23. This may be done either before or after the solvent vehicle V has been poured into inner container section B. Finally, cap C is applied to the respective contiguous mouths 27 and 28 of container sections B and A and the loaded container is thereby sealed and ready for any further wrapping and packaging in a carton with other like containers. It will be observed that cap C is of the conventional type used to hermetically seal the mouths of bottles containing hypodermic injection ingredients and thus is capable of enclosing and frictionally gripping the inner surface of the inner container section B and the outer surface of outer container section A.

Fig. 4 shows the use of soft rubber in the construction of inner container section B. In this instance, the rubber inner container section B is separately produced prior to assembly with outer container section A as distinguished from the mode of production to be described presently in connection with the disclosure in Fig. 5. Because inner container section B is made of soft, flexible rubber, and will be subjected to inward axial stress when cap C is applied, it has been necessary to form an out-turned marginal lip flange 30 on the mouth 27 of said container section B for overlying engagement with the mouth 28 of outer container section A. When common cap C is fitted to the mouths of both container sections after they have been loaded with their respective hypodermic solution ingredients, lip 30 of inner container section B will be clamped securely between the said cap and mouth rim 28 of outer container section A, whereby an even more efficient sealing effect will be obtained than is possible in the Fig. 1 embodiment. The primary function of lip 30, however, is to anchor the mouth 27 of inner container section B to mouth 28 of outer container section A in resistance to the frictional thrust of the core of cap C when being applied to the container.

Incidentally, the use of a rubber inner container section for cooperation with the converted, medially constricted outer container section illustrated in Figs. 1 to 5, inclusive, probably will be limited to production of containers for packaging ingredients that do not include as the medicament a solidifying substance like vitamin B, because it is desirable to use a membrane 31 of pyroxylin to seal passage 23 and to cause the bottom wall 23 of the rubber inner container section B to adhere tightly to wall 22, and, as has already been explained, the installation of such a pyroxylin membrane cannot be undertaken safely after the medicament ingredient has been admitted to compartment 20. Membrane 31 preferably is installed by following the collodion drop method disclosed in my cited co-pending application, according to which a drop of collodion is deposited on wall 22 in closing relation to passage 23. After evaporation of the ether or other volatile solvent, a pure pyroxylin membrane will remain in tenacious marginal adherence to wall 22. By installing membrane 31 on the side of wall 22 which faces compartment 21, and by inserting rubber inner container section B in compartment 21 before the collodion drop has become completely solidified, the bottom wall 26 of inner container section B will be united adhesively to wall 22 of outer container section A by the said membrane. The primary purpose of the pyroxylin membrane 31 in this instance is to anchor the bottom wall 26 of the inner container section B to wall 22 of the outer container section A and thereby prevent upward collapse of the said inner container section when accidental violent motion of the container as a whole in handling or shipment results in axial surge of the ingredient contents, particularly the medicament. Such collapse, otherwise, would permit a substantial quantity of the medicament ingredient to penetrate the space thus created between the side walls of inner container section B and compartment 21 of outer container section A with consequent loss of those particles that remain in the space between walls and do not enter the final injection solution when the medicament and solvent vehicle are admixed.

Fig. 5 shows a rubber inner container section B that is wholly produced inside compartment 21 of outer container section A under conditions that produce an even more intimate anchorage between the bottom wall of the said inner container section and wall 22 of the outer container section. In this instance, the rubber used must be in a liquid state, which may be obtained by dissolving pure rubber in a suitable solvent such as toluol or toluene. The rubber may be natural or synthetic such as neoprene. Inner container section B is produced by coating the inner surface of compartment 21 with the liquid rubber. After the solvent has evaporated, a thin translucent inner container section B will be formed in tenacious all-around adherence to the said surface of compartment 21. The coating preferably is applied by a special method which should be preceded by sealing passage 23 with the pyroxylin membrane 31 previously described. With membrane 31 in place, outer container section A is supported in the position shown in Fig. 5 with compartment 21 uppermost and open. Then, the liquid rubber is poured into compartment 21 until the latter is substantially half-filled. Immediately thereafter, outer container section A is inverted and the rubber contents permitted to flow outward. In so doing, the coating of desired thickness is formed. If membrane 31 were not present in closing relation to passage 23 when the rubber is poured into compartment 21, it would escape through passage 23 into compartment 20.

That is the purpose of membrane 31 in this instance. It is not needed to effect the desired adhesion between the bottom wall 26 of inner container section B and wall 22 of the outer container section A, for the internally coated container section B is self-adhering. Because of the complete adherence of inner container section B to the inner surface of compartment 21 throughout its length, no marginal lip for the mouth of said inner section is required.

The preferred type of my improved container, which does not involve utilization of any part of the container disclosed in my cited co-pending application, is illustrated in two alternative forms in Figs. 6 and 7 and Figs. 8 and 9, respectively.

Referring first to Figs. 6 and 7, it will be noted that outer container section A is in the form of a conventional bottle having a large diameter neck 32 and terminal mouth 28, and which preferably is made of clear glass. Neck 32 of outer container section A serves as the receiver for inner container section B, which is shown as being identical in shape with the inner container section B in Fig. 4 and which preferably is made of suitable transparent plastic material, such as Lucite. Neck 32 is quite short in conventional bottles of the type illustrated, but will afford adequate embracing support for the mouth portion of inner container section B, which latter preferably is of standard proportions and cubical contents related to the volume of liquid solvent vehicle V that is to be accommodated. Consequently, the inner container section B will project below neck 32 to a considerable extent and an annular mixing chamber 33 will be formed surrounding the inwardly projecting portion of said inner section B. The space between the bottom end of inner container section B and the bottom of outer container section A should be sufficient to accommodate the appropriate quantity of medicament M and also augment the volume of annular mixing chamber 33 to such a degree that the combined mixing space will exceed the volume of the liquid solvent vehicle contents of said inner container section. As a result of these relative space proportions, the two ingredients V and M may be admixed without creating excessive compression of air within the outer container section A.

Although inner container section B is made of rigid plastic material, it is necessary to employ the lip-flange construction shown because there is no support for bottom wall 26 as in the previously described embodiments. Otherwise, application of closure cap C and subsequent needle pressure on wall 26 would both tend to dislodge inner container section B from its engagement with neck 32 of the outer container section.

In the use of the container disclosed in Figs. 6 and 7, loading with ingredients is accomplished by pouring the medicament M into outer container section A before the two container sections are assembled. Inner section B may be provided with its solvent vehicle contents V either before or after such assembly, after which cap C is applied to the contiguous mouths of both container sections in the usual manner.

The modification of the preferred general form of container illustrated in Figs. 8 and 9 differs from the embodiment disclosed in Figs. 6 and 7 only in the form of outer container section A, which in this instance is of uniform diameter throughout its length and proportioned to slidably fit the entire cylindrical outer surface of inner container section B and to provide the required volume of space between the respective bottoms of both said container sections for accommodation of the medicament M and solvent vehicle V when admixed with an additional allowance for captivated air. The complete container shown in Figs. 8 and 9 is considerably longer and smaller in external diameter than the container shown in Figs. 6 and 7, which difference is designed to suit the two container models to different conditions of carton packaging and operational use which may be encountered in practice.

Since it may under some circumstances be highly desirable to make the inner container section of glass or other frangible material which otherwise may meet all medical requirements, the objectionable features of difficult needle-penetration and frangibility may be overcome by adopting the structure disclosed in Figs. 10 to 12. In this instance, inner container section B has a central aperture 34 of suitable size for needle penetration. By installing a pyroxylin membrane 31 in the previously described manner (collodion drop method) in closing relation to aperture 34, the said aperture will be properly sealed by a puncturable medium of non-frangible material.

The method of admixing the two related ingredients in any of the several embodiments of my improved container is depicted in Fig. 6, wherein the needle N of a hypodermic syringe is shown in full lines in the initial position occupied after penetration of cap C. In this position, the plunger (not shown) of the syringe is operated in well-known manner to suck the solvent vehicle V from inner container section B into the syringe for later ejection into outer container section A after the needle N has penetrated the bottom wall 26 of the said inner section and has assumed the broken line position. When the two ingredients have been mixed thoroughly by shaking the united syringe and container, the injection solution thus produced is sucked into the syringe by plunger action and needle N is withdrawn from the container. All of these operations obviously transpire while the ingredients and needle are effectively sealed from the atmosphere and thus protected against contamination.

Although not required to insure satisfactory adhesion between the pyroxylin membrane and any glass surface to which it may be applied, it is desirable to prepare the surface by grinding when practicable. The percentage of rejections during production of the container covered by my herein-mentioned co-pending application was reduced by grinding the area of the intermediate partitioning wall immediately surrounding the through passage therein. This precautionary measure may be applied to the glass inner container section B disclosed in Figs. 10 to 12 of the accompanying drawings by grinding the surface of the bottom wall 26 around aperture 34. Thorough scrubbing should follow to insure removal of all glass particles.

For the sake of brevity in the claims, the terms "puncturable" or "needle-puncturable", when used in reference to any part of the container structure, are to be interpreted to mean that the part so described is composed of a material that meets the medical requirements of needle-penetrability without fragmentation (non-frangibility), non-toxicity, and chemical inertness to the ingredients that may come into contact therewith.

Having thus described my invention, I claim:

1. A unitary container for separately packaging the related ingredients of a hypodermic injection charge prior to admixture, which said container comprises an outer container section having a filling mouth, and an inner thimble-shaped container section also having a filling mouth and adapted to be positioned within the outer container section in telescoping relation thereto with its mouth embraced by the mouth of the outer container section and with the rims of both mouths substantially flush, both said mouths being so constructed as to fit each other in close sliding contact, the composition of the inner container section being such that at least a needle-size area of its interiorly located bottom wall is needle-puncturable, the flush rim mouths of both container sections being adapted to be closed and sealed by application of a common puncturable closure cap of conventional design which encloses and frictionally grips the inner surface of the inner section and the outer surface of the outer section.

2. A unitary container for separately packaging the related ingredients of a hypodermic injection charge prior to admixture, which said container comprises an outer container section having a filling mouth, an inner thimble-shaped container section also having a filling mouth and adapted to be positioned within the outer container section in telescoping relation thereto with its mouth embraced by the mouth of the outer container section, and with the rims of both mouths substantially flush both said mouths being so constructed as to fit each other in close sliding contact, the composition of the inner section being such that at least a needle-size area of its interiorly located bottom wall is needle-puncturable, and common puncturable closure means for the flush rim mouths of both container sections, said closure means being constructed to enclose and frictionally grip the inner surface of the inner section and the outer surface of the outer section.

3. A unitary container as defined in claim 1, which includes means for unyieldingly supporting the inner container section within the outer container section with the bottom wall of said inner section in fixed spaced relation to the bottom wall of said outer section in resistance to inward thrust.

4. A unitary container for separately packaging the related ingredients of a hypodermic injection charge prior to admixture, which said container comprises a tubular outer container section having an intermediate partitioning wall dividing the same into two ingredient compartments, said wall having a central through passage for needle-penetration, one of said compartments having a filling mouth at its outer end, and an elongated inner container section having one end closed and the other end open to form a filling mouth, said inner container section being adapted to be positioned in the last-mentioned compartment of the outer container section with its bottom wall abutting the said partitioning wall of said outer section in closing relation to the said through passage and with its mouth embraced by the mouth of the outer container section in closely contacting and substantially flush relation thereto, the composition of the inner container section being such that at least a needle-size area of its bottom wall in alignment with the passage in the partitioning wall of the outer container section is needle-puncturable.

5. A unitary container as defined in claim 4, wherein the inner container section is composed of soft rubber and a sealing membrane of pyroxylin is interposed between the bottom wall of the inner container section and the partitioning wall of the outer container section in closing relation to the passage in the latter wall.

6. A unitary container as defined in claim 1, wherein the telescoping container sections fit contiguously throughout the length of the inner container section and the outer container section is sufficiently longer than said inner section to provide adequate space inward of said inner section to accommodate one of the ingredients the container is designed to hold.

7. A unitary container as defined in claim 1, wherein the inner container section is provided with an out-turned lip on the mouth thereof to overlie the mouth rim of the outer container section and thereby unyieldingly support said inner container section within said outer container section with the bottom wall of the former in fixed spaced relation to the bottom wall of the latter in resistance to inward thrust.

8. A unitary container as defined in claim 4, wherein the inner container section is composed of soft rubber and a sealing membrane of pyroxylin is interposed between the bottom wall of the inner container section and the partitioning wall of the outer container section in closing relation to the passage in said partitioning wall, said sealing membrane being adhesively united to both of said walls.

GEORGE H. SEEMAR.

REFERENCES CITED

The following references are of record in the file of this patent:

UNITED STATES PATENTS

| Number | Name | Date |
| --- | --- | --- |
| 754,015 | Ryan | Mar. 8, 1904 |
| 1,166,806 | Aronson | Jan. 4, 1916 |
| 1,594,595 | Bauer | Aug. 3, 1926 |
| 1,765,794 | Hirth | June 24, 1930 |
| 1,867,881 | Crockett | July 19, 1932 |
| 2,023,905 | Schwab | Dec. 10, 1935 |
| 2,028,751 | Barton | Jan. 28, 1936 |
| 2,324,735 | Spanel | July 20, 1943 |
| 2,487,236 | Greenberg | Nov. 8, 1949 |
| 2,494,294 | Greenberg | Jan. 10, 1950 |
| 2,495,942 | Nosik | Jan. 31, 1950 |

FOREIGN PATENTS

| Number | Country | Date |
| --- | --- | --- |
| 238,592 | Switzerland | Nov. 16, 1945 |